(12) United States Patent
Pearson et al.

(10) Patent No.: US 7,974,466 B2
(45) Date of Patent: Jul. 5, 2011

(54) METHOD FOR DERIVING CONSISTENT, REPEATABLE COLOR MEASUREMENTS FROM DATA PROVIDED BY A DIGITAL IMAGING DEVICE

(75) Inventors: Christopher H. Pearson, Springboro, OH (US); Gary N. Bodnar, Springboro, OH (US); Karl F. Seibert, Kettering, OH (US)

(73) Assignee: Color Savvy Systems Limited, Springboro, OH (US)

( * ) Notice: Subject to any disclaimer, the term of this patent is extended or adjusted under 35 U.S.C. 154(b) by 913 days.

(21) Appl. No.: 11/286,662

(22) Filed: Nov. 23, 2005

(65) Prior Publication Data

US 2006/0159337 A1 Jul. 20, 2006

Related U.S. Application Data

(60) Provisional application No. 60/631,078, filed on Nov. 23, 2004.

(51) Int. Cl.
*G06K 9/00* (2006.01)
(52) U.S. Cl. ........ 382/167; 382/312; 382/305; 382/298; 382/299; 358/461; 358/513; 348/180; 348/188; 348/658; 348/135
(58) Field of Classification Search .................. 382/167, 382/312, 305, 298–299; 358/461, 513
See application file for complete search history.

(56) References Cited

U.S. PATENT DOCUMENTS

| | | | |
|---|---|---|---|
| 3,971,065 A | | 7/1976 | Bayer |
| 4,185,920 A | * | 1/1980 | Suga .............................. 356/406 |
| 4,405,940 A | | 9/1983 | Woolfson et al. |
| 4,564,945 A | * | 1/1986 | Glover et al. .................. 714/769 |
| 4,812,904 A | * | 3/1989 | Maring et al. ................. 348/135 |
| 4,831,437 A | * | 5/1989 | Nishioka et al. ................ 348/71 |
| 4,991,007 A | | 2/1991 | Corley |
| 5,150,199 A | * | 9/1992 | Shoemaker et al. .......... 348/180 |
| 5,371,538 A | | 12/1994 | Widger |
| 5,526,285 A | | 6/1996 | Campo et al. |
| 5,537,516 A | | 7/1996 | Sherman et al. |
| 5,760,829 A | | 6/1998 | Sussmeier |
| 5,850,472 A | * | 12/1998 | Alston et al. ................... 382/162 |
| 6,069,973 A | * | 5/2000 | Lin et al. ........................ 382/167 |

(Continued)

FOREIGN PATENT DOCUMENTS

DE 19633557 3/1998

(Continued)

OTHER PUBLICATIONS

Vrhel and Trussell "Color Device Calibration: A Mathematical Formulatio", IEEE Transactions on Image Processing, vol. 8, No. 12, Dec. 1999.*

(Continued)

*Primary Examiner* — Samir A Ahmed
*Assistant Examiner* — Mekonen Bekele
(74) *Attorney, Agent, or Firm* — Thompson Hine LLP

(57) ABSTRACT

A method for obtaining a target color measurement using an electronic image capturing device comprising the steps of: (1) determining one or more of a field correction array, level correction vectors, a color correction matrix, and a calibration correction and; (2) adjusting a target color measurement based upon one or more of a field correction array, level correction vector, a color correction matrix, and a calibration correction to obtain a corrected color target measurement.

9 Claims, 6 Drawing Sheets

U.S. PATENT DOCUMENTS

| | | | |
|---|---|---|---|
| 6,084,983 A * | 7/2000 | Yamamoto | 382/167 |
| 6,205,243 B1 | 3/2001 | Migdal et al. | |
| 6,369,895 B1 | 4/2002 | Keeney | |
| 6,525,819 B1 | 2/2003 | Delawter et al. | |
| 6,546,119 B2 | 4/2003 | Ciolli et al. | |
| 6,580,820 B1 * | 6/2003 | Fan | 382/135 |
| 6,594,377 B1 | 7/2003 | Kim et al. | |
| 6,654,048 B1 * | 11/2003 | Barrett-Lennard et al. | 348/180 |
| 6,944,494 B2 | 9/2005 | Forrester et al. | |
| 7,102,669 B2 | 9/2006 | Skow | |
| 7,136,036 B2 * | 11/2006 | O'Donnell | 345/88 |
| 7,218,358 B2 * | 5/2007 | Chen et al. | 348/658 |
| 7,233,871 B2 | 6/2007 | Raymond et al. | |
| 7,336,401 B2 * | 2/2008 | Unal et al. | 358/448 |
| 7,728,845 B2 * | 6/2010 | Holub | 345/589 |
| 2002/0012895 A1 | 1/2002 | Lehmann | |
| 2002/0126328 A1 | 9/2002 | Lehmeier et al. | |
| 2003/0020724 A1 * | 1/2003 | O'Donnell | 345/589 |
| 2003/0071998 A1 | 4/2003 | Krupka et al. | |
| 2003/0076498 A1 | 4/2003 | Pfister | |
| 2003/0156118 A1 | 8/2003 | Ayinde | |
| 2003/0169347 A1 * | 9/2003 | Jenkins | 348/222.1 |
| 2003/0174886 A1 | 9/2003 | Iguchi et al. | |
| 2004/0001210 A1 * | 1/2004 | Chu et al. | 358/1.9 |
| 2004/0078299 A1 | 4/2004 | Down-Logan et al. | |
| 2004/0136579 A1 | 7/2004 | Gutenev | |
| 2004/0167709 A1 | 8/2004 | Smitherman et al. | |
| 2004/0179101 A1 * | 9/2004 | Bodnar et al. | 348/188 |
| 2004/0189837 A1 | 9/2004 | Kido | |
| 2004/0264767 A1 * | 12/2004 | Pettigrew | 382/162 |
| 2005/0018890 A1 | 1/2005 | McDonald et al. | |
| 2005/0146733 A1 * | 7/2005 | Lohweg et al. | 358/1.9 |
| 2007/0225560 A1 | 9/2007 | Avni et al. | |
| 2008/0128589 A1 | 6/2008 | Drummond et al. | |

FOREIGN PATENT DOCUMENTS

| | | |
|---|---|---|
| JP | 5-289206 | 11/1993 |
| JP | 2002-190959 | 7/2002 |
| WO | WO 03/029766 | 4/2003 |
| WO | WO 2004/018984 | 3/2004 |

OTHER PUBLICATIONS

Vrhel, M.J. et al., "Color Device Calibration: A Mathematical Formulation," I.E.e.E. Transaction on Image Processing, vol. 8, No. 12, pp. 1796-1806 (Dec. 1999).

Pratt, W.K., *Digital Image Processing*, John Wiley & Sons, NY, pp. 171-191 (1991).

* cited by examiner

US 7,974,466 B2

METHOD FOR DERIVING CONSISTENT, REPEATABLE COLOR MEASUREMENTS FROM DATA PROVIDED BY A DIGITAL IMAGING DEVICE

CROSS-REFERENCE TO RELATED APPLICATIONS

This application claims priority from U.S. Provisional Application No. 60/631,078 filed Nov. 23, 2004.

FIELD OF THE INVENTION

This invention is a method for processing data provided by an electronic image-capturing device in a way that makes it self-calibrating, and allows it to determine precise colors of a segment or segments of the captured image.

SUMMARY OF THE INVENTION

An electronic image capture device (typically a digital camera) captures an image of a target area of unknown color on an object along with reference colors that have been placed in its field of view in close proximity to the target area. Pre-determined color measurements have been made for the reference colors, with data reported as separate intensity values for each channel—typically red, green, and blue. These data are corrected using a four-step mathematical process that generates values for the corrected intensity values in each channel for the target area independently of the state of the imaging device and variations in the illumination of the target.

One use of the invention applies it to measure skin color or hair color to assist in the selection of health and beauty products. The device is placed against the skin or hair and pixel values are collected from each channel from the target area and reference colors. These data are processed in software to determine the color of the target area. The software can then either report the color or do further processing to identify the product with the best color match, recommend what coloring products & processes to use to achieve a target color, or to predict and/or simulate (present a visual representation of) the result when a particular product is selected.

Another use of the invention applies it to measure colors of a home déecor product to assist in the selection, make recommendations and/or assess the compatibility of various products. The device is placed against the target product, and pixel values are collected from each channel from the target area and reference colors. These data are processed in software to determine the actual color of the target area. The device can then report the color information or do further processing to, for example, suggest product(s) of a closely matching color, report the level of similarity to a second color measured and processed in a similar way, assess compatibility with a second color measured in a similar way, and/or recommend other colors that would be compatible with the measured color.

DETAILED DESCRIPTION

Operational Overview

Figure 1:
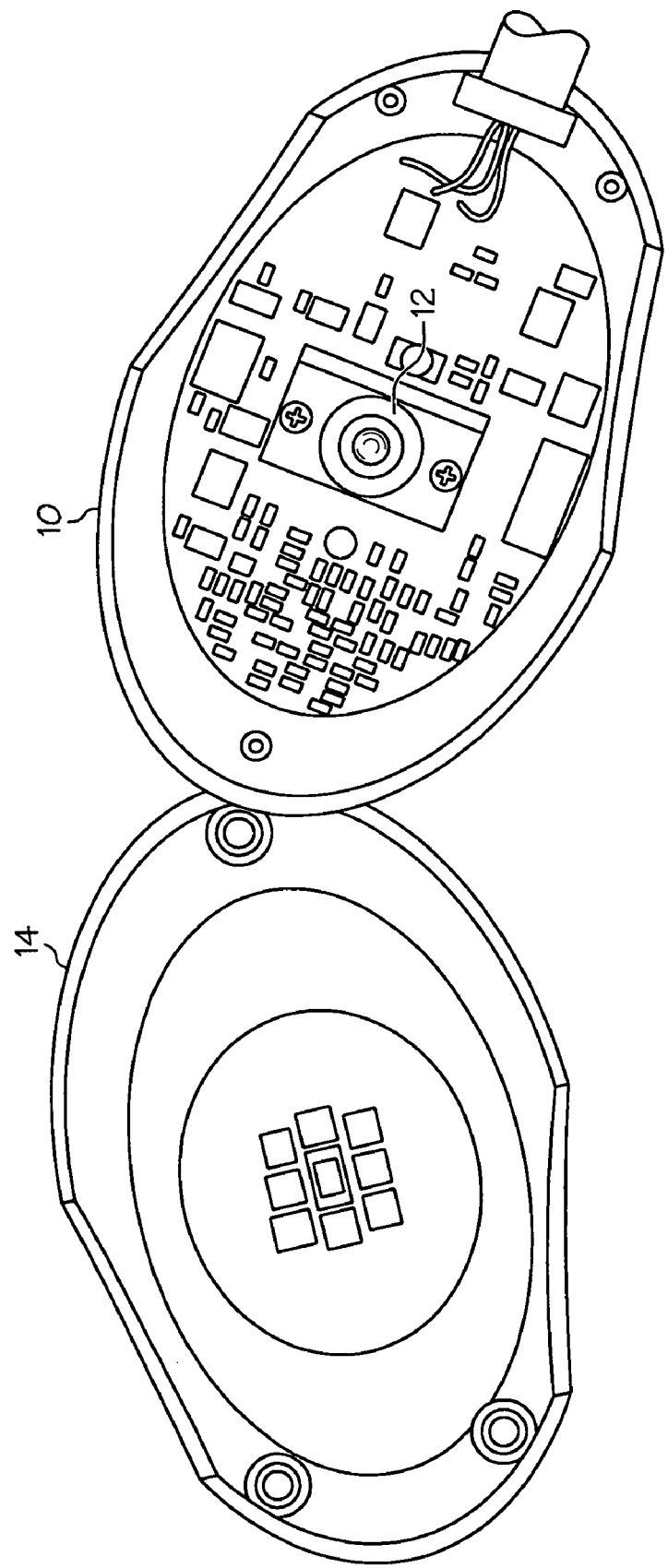
FIG. 1 is a photograph of a circuit board and target housing in accordance with one embodiment of the invention.
Figure 2A:
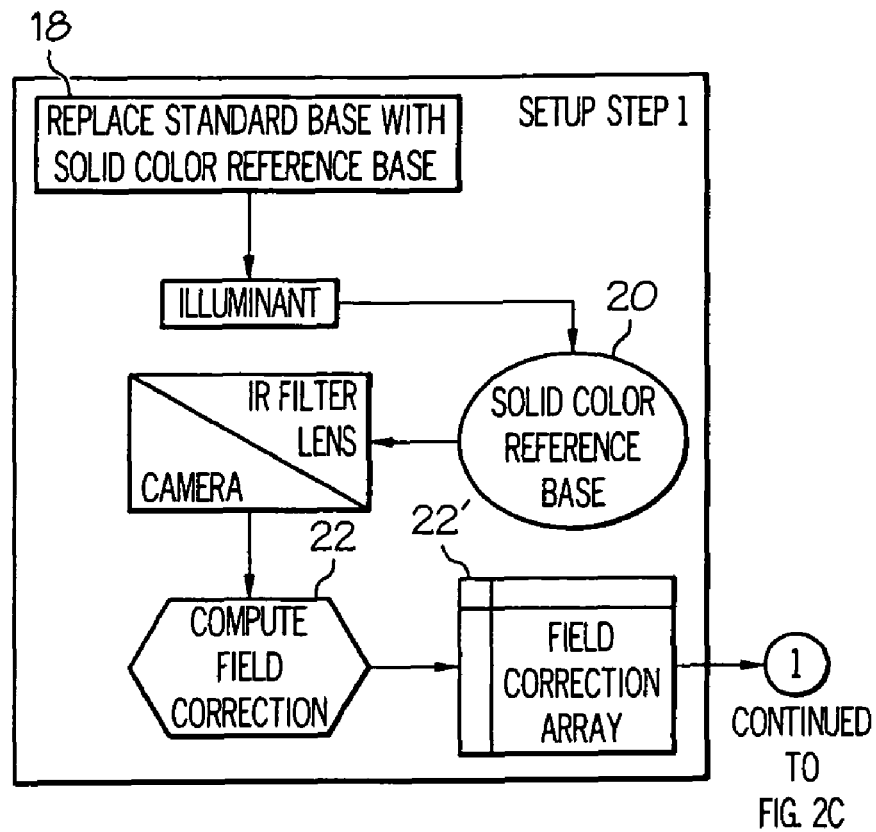
FIG. 2 is a flow chart showing the Setup Steps used in accordance with one embodiment of the invention.
Figure 2A:
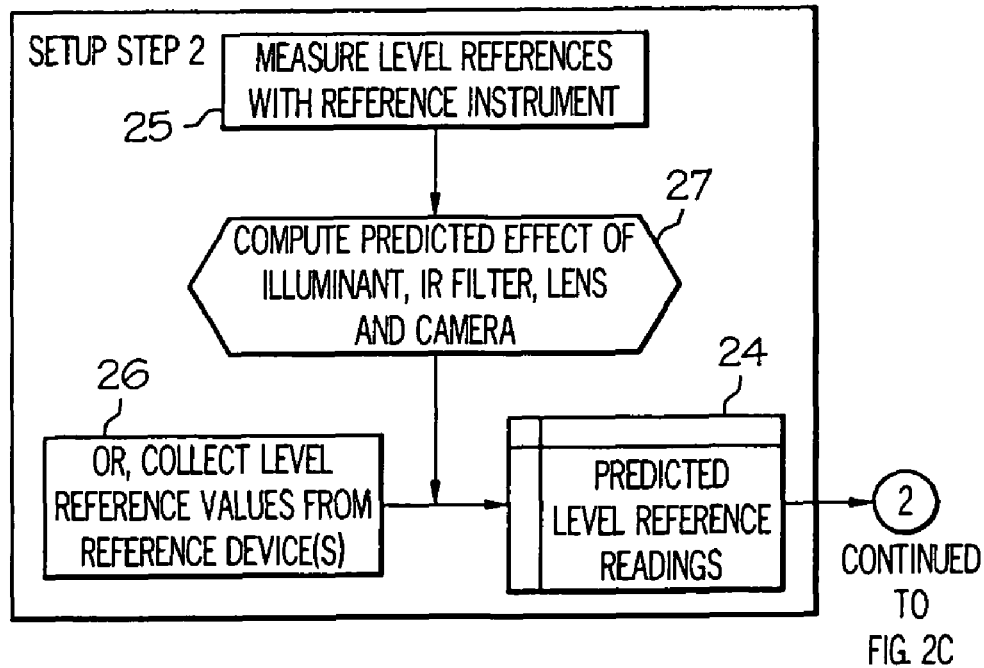
Figure 2B:
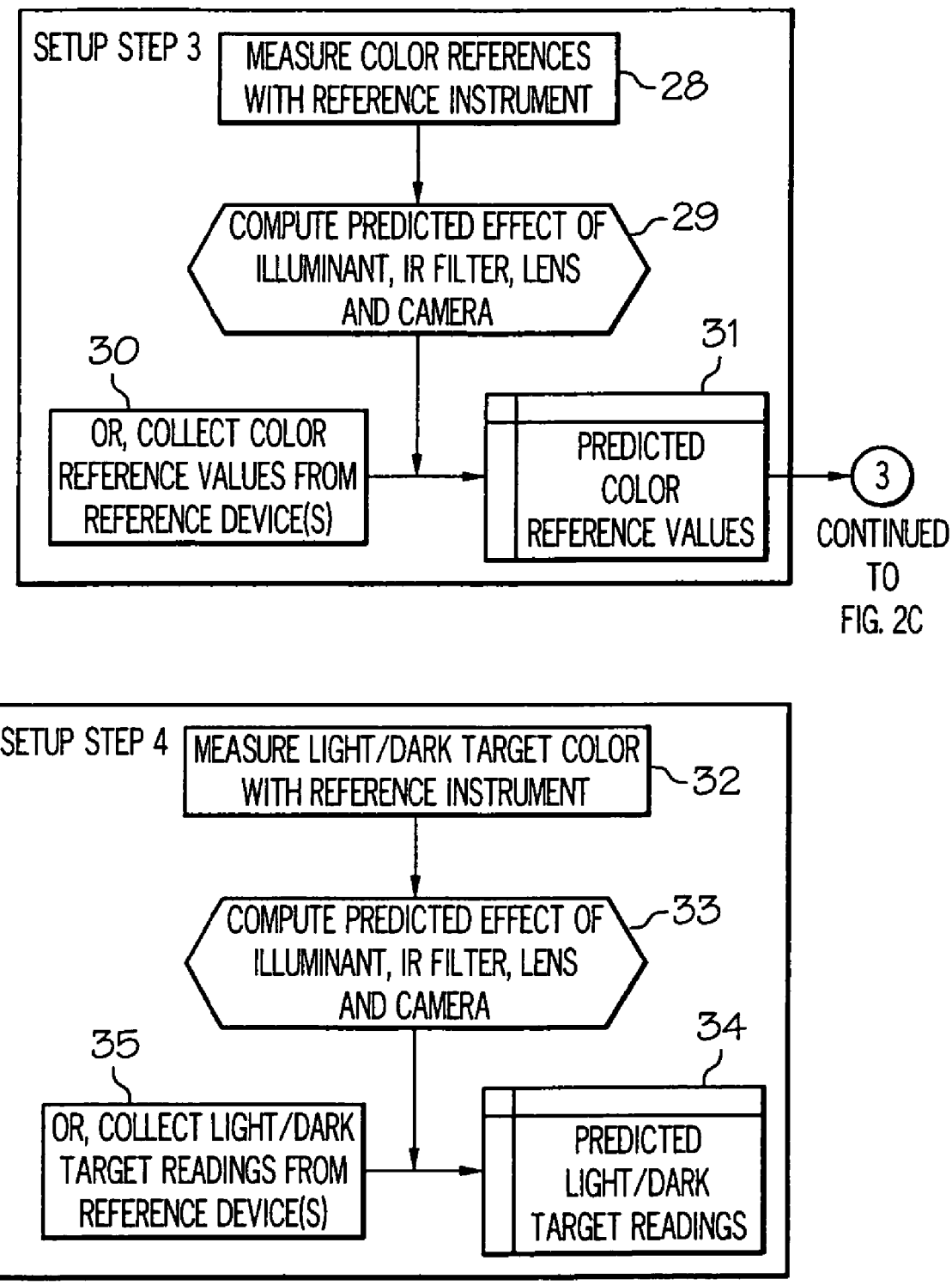
Figure 2C:
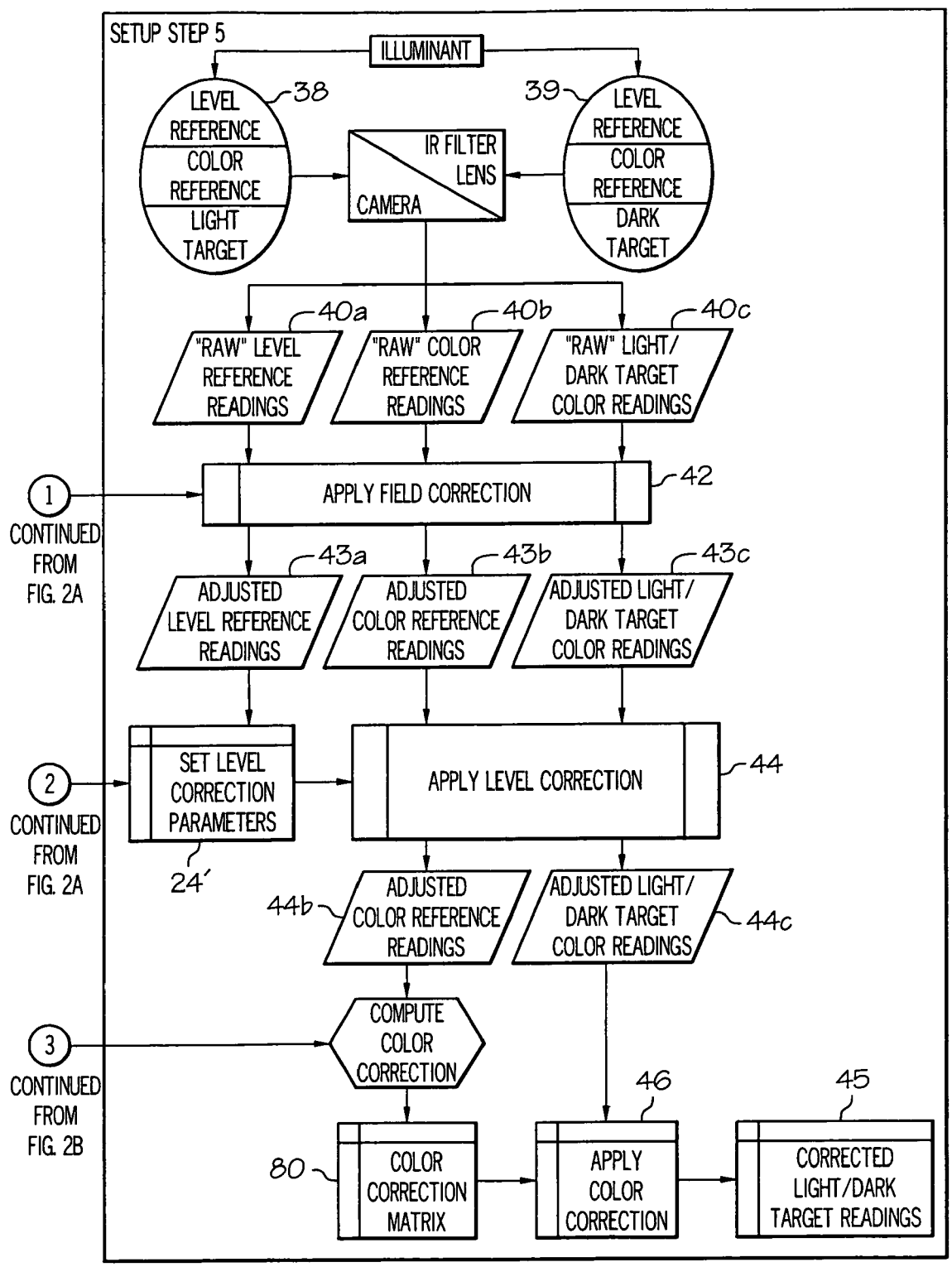

In operation, an image capture device (typically including a digital imaging chip such as a color CMOS or CCD sensor or monochrome sensor with external color filters that site under the lens 12 shown in FIG. 1) is used. Such a device generally treats an image as a set of points arranged in a two-dimensional matrix (pixels). To capture color, the light at each pixel is passed through a filter that is built into the imaging device that allows typically only the red, the green or the blue components of the light to pass. In this configuration, the two-dimensional array of pixels is overlaid with a two-dimensional array of red, green and blue filters arranged in a regular pattern to ensure that color information is captured evenly across the image. In one embodiment a Bayer array can be used. In one embodiment, the device provides numeric readings that are proportional to the intensity of light passing through the filter and falling upon each pixel.

The image capture device, as used in one embodiment of this invention, captures an image of a set of fixed reference colors and an unknown color for which a measurement is desired (target region) as described in US Patent application US 2004/0179101 which is incorporated herein by reference. The fixed reference colors 14 (FIG. 1) are used to make a series of adjustments to the measurement data that correct for differences between individual devices and changes to the state of a device (including changes in the illumination of the target), all to ensure uniform performance—both within the device (repeatability) and across multiple devices (consistency). The fixed references typically include as many color samples as can practically fit in the view of the image capture device, in the illustrated embodiment eight are used. Typically, a minimum of two references (a black and a white) is required, but for accurate color measurement across the full spectrum of colors more references are preferred. In practice including a red, green, blue, cyan, magenta and yellow reference provides reasonable coverage of color space. In one embodiment, extra references may be used depending on the particular color sensitivity of the chosen imaging device, and, if space permits, both light and dark samples of the colors cited above can further improve the device's ability to discriminate colors.

Prior to using the device, a series of "Setup Steps" is conducted (typically in manufacturing) to profile the performance of each device as compared to other devices, a particular reference device or devices, and/or standard, calculated, "predicted" performance. These Setup Steps yield data that capture the unique characteristics of each device. In operation, the device uses data generated by the Setup Steps to perform a series of mathematical corrections, herein referred to as "Operational Adjustments" that process/correct the raw data from the image capture device.

A description of the Setup Steps is outlined in the flowchart shown as FIG. 2, followed by a detailed description of each step. The Operational Adjustments used in one embodiment are summarized in the flowchart shown as FIG. 3, followed by a detailed description of each of the adjustment steps.

Setup Step 1: Field Correction. Field correction compensates for differences in illumination and detector sensitivity from region to region. To perform this connection, the same color is placed in each reference color region. The imaging system should report each region with the same value c.

However, because of differences in illumination and detector response, there will typically be a different measurement $m_i$ for each of the i regions of interest. In certain embodiments, it may not be required to place the same color in all the reference color regions, although this is the desirable approach.

The goal of the field correction step is to solve for a correction value $x_i$ for each region of interest so that after the correction value is applied, each region will measure the same value as shown in equation 1.

$$c = x_i \times m_i \quad (1)$$

The constant c depends on the target color used in the field correction process. If (typically) a mid-tone gray color is chosen, c would be 0.5 for all channels.

To find the field correction values in one embodiment, the multiple reference colors 14 mentioned earlier are replaced in step 18 with a uniform, single color 20. This same color is also placed in the target area so that the target area and the regions of interest are the same. The device reports data (typically R, G, and B pixel values) from these regions, $m_i$ and uses equation 2 in step 22 to calculate the field correction array of $x_i$ values—one for each channel in each region.

$$x_i = \frac{m_i}{c} \quad (2)$$

Since lighting, shadows, lens anomalies, etc, can "corrupt" any one of the readings, it's important that each reference area and the target area be "equalized" to factor out any irregularities. For this reason, a single color (e.g., all reference colors the same) is read.

Setup Step 2: Level Correction. Level correction scales the region measurements to the neighborhood of the predicted reference responses. Because environmental conditions and other external influences (e.g., a low battery vs. a fresh battery) can change the performance of the electronics, a measurement of a color made on one occasion may not return the same values as a measurement of that exact same color made on another occasion. Scaling compensates for these changes in the device. It records readings from the black and white (or representative dark and light) references at a point in time. These values are used to define the "base state" of the device. This allows future readings to be mathematically adjusted, such that the range of values provided by the device under that new set of conditions can be converted to values in the range the device reported in its base state.

The fixed references contain typically 2 reference colors for level correction. In one embodiment the level correction colors include a light or highly reflective sample and a dark or highly absorbing sample. There are several workable approaches to choosing the light and dark references, but in practice, the scaling process will be successful as long as the scaling references approximate the lightest and darkest colors that the device will be expected to measure. As an alternative approach in another embodiment, a mid-range gray reference can be used as a single-point scaling reference, but the two-reference approach as described above will typically better characterize changes in performance.

In setup step 2, the predicted responses 24 for the level correction references are determined in step 27. In one embodiment of the invention, the imaging system is designed to report a vector t typically of device red, green and blue responses to a color stimulus. That color stimulus r is a vector of n spectral reflectance values. In one embodiment n is 31, which segments the visible light spectrum into 10 nm bands, but smaller or larger bands (and larger or smaller n's) are also possible. The process can be modeled in the following matrix/vector equation:

$$t = F^T D^T I^T L^T r \quad (3)$$

where, in the case of an image capture device that reports red, green and blue values, F is an n×3 matrix where the 3 columns are n spectral transmittances for the red, green and blue filters respectively, D is an n×n diagonal matrix of the detector quantum efficiency, I is an n×n diagonal matrix of the spectral transmittance of the optical system including the lens and infrared cutoff filter, and L is an n×n diagonal matrix of the illumination spectral power distribution.

The spectral quantities D, I, and L in equation 3 can either be measured directly in step 25 or supplied by the manufacturer of the component in question as shown in step 26, namely the imaging device in the case of D, the lens and infra-red filter in the case of I, and the illumination source (a white LED in this embodiment) in the case of L. Those quantities may be for a specific device or average component and as such may not represent any individual imaging system constructed. This model of the imaging system is used in step 27 to calculate the predicted responses of the system to any color in the image it captures, and these predicted values 24 can be used to calculate corrections that compensate for the unique characteristics of an individual imaging system.

Predicted values of red, green and blue intensity for the level correction references can be found using equation 3 and the spectral reflectance of the light and dark references obtained from either a data sheet or measurement with a suitable instrument. Equation 3 yields vectors $t_L$ and $t_D$ which contain the predicted red, green and blue channel values for the light and dark references respectively.

As an alternative embodiment of the invention, rather than predicted response, R, G, and B intensity measurements for the light and dark references 26 can be acquired from one or more devices and used as reference readings 24 for level correction.

Setup Step 3: Color Correction. As noted earlier, the fixed references also include a set of m colors for color correction. These predicted values for these references are used in operation of the device to make color adjustments. In setup step 3, the predicted responses for color correction references are computed in steps 28 and 29 in the same manner as that used to compute the predicted response for the level correction references (steps 25 and 27). Using a vector of m spectral reflectance values from the color correction references as color stimulus r (either from data sheets or measured) and equation 3, a red-green-blue image capture device yields a 3×m matrix Y that contains the predicted values 31.

As an alternative, rather than predicted response, R, G, and B intensity measurements can be acquired in step 30 from one or more devices and used as reference readings for color correction.

Setup step 4: Calibration Predicted Values. Calibration samples are 2 colors that are measured by the device as targets to calculate a calibration correction in step 32. The 2 colors are typically a light or highly reflective sample and a dark or highly absorbing sample. Preferably these samples should be different from the level correction reference colors that are part of the device, as discussed in Setup Step 3 because calibrating performance using two additional colors will improve performance of the device, but if necessary, the same light and dark reference colors could be used. If different colors are chosen as calibration samples, again, they should be chosen to approximate boundaries of the span of colors intended to be measured by the device.

In setup step 4, in accordance with one embodiment, the color references are measured in step 32 and the predicted responses 34 for calibration correction samples are computed in step 33 in an analogous manner as that used to compute the predicted response 24 for the level correction references. Using a vector of m (typically 31 or more, as discussed above) spectral reflectance values from the calibration correction targets as color stimulus r (either from data sheets or measured) and equation 3, yields vectors $c_L$ and $c_D$ which contain the predicted red, green and blue channel values 34 for the light and dark calibration samples respectively.

Again, as an alternative embodiment of the invention, measurement data can be acquired in alternate step 35 from one or more devices and used as reference readings for calibration.

Setup Step 5: Calibration Using Light and Dark Targets. The light and dark calibration samples for which predicted values were derived in setup step 4 are measured at 38 and 39 by the device like an unknown target. In normal operation, the device makes four successive adjustments to the raw data from an unknown target: field correction, level correction, color correction and calibration correction, as described in the following section. For setup step 5, the raw data from the color references 40$b$ and the level reference readings 40$a$ are collected for each of the light and dark target colors 38/39. This data and the raw data from the light and dark calibration targets 40$c$ are processed using only the first three of these adjustments in steps 42, 44 and 46. The field correction 22' is applied to yield field-adjusted level reference, color reference and light/dark color readings 43$a$, 43$b$, and 43$c$ respectively. The level correction 24 is applied 24' to the field-adjusted reference and light/dark target values 43$b$ and 43$c$ in step 44 to yield level-adjusted color and light/dark color readings 44$b$ and 44$c$ respectively. Based upon the predicted color values 31 and the level-adjusted reference values, a color correction matrix 80 is determined as discussed in detail in U.S. Published Application 2004/0179101.

The result 45 of these three adjustments is two vectors, $x_L$ and $X_D$, which, in the typical case, contain the measured and adjusted red, green and blue channel values for the light and dark calibration samples respectively. These data are used in operation of the device to make the fourth adjustment—the calibration correction.

Operational Adjustments

During operation in step 48, "raw" data (i.e., unprocessed, uncorrected and unadjusted) is collected from the target area 49$c$ that contains the color for which a color measurement is desired, and also from light and dark level references 49$a$ and reference color samples 49$b$. These data are used in conjunction with data collected and derived during the Setup Steps to make a series of adjustments to the raw target data provided by the imaging device as described below.

The result of these adjustments is typically a set of red, green and blue values for the unknown color in the target area that, for any given target color, remain largely consistent regardless of changes within the device and largely consistent from one device to another. Optionally, using standard device characterization techniques, the resulting values can be further transformed[1] to an industry standard color space like CIE X, Y, Z, or CIELAB.

Figure 3:
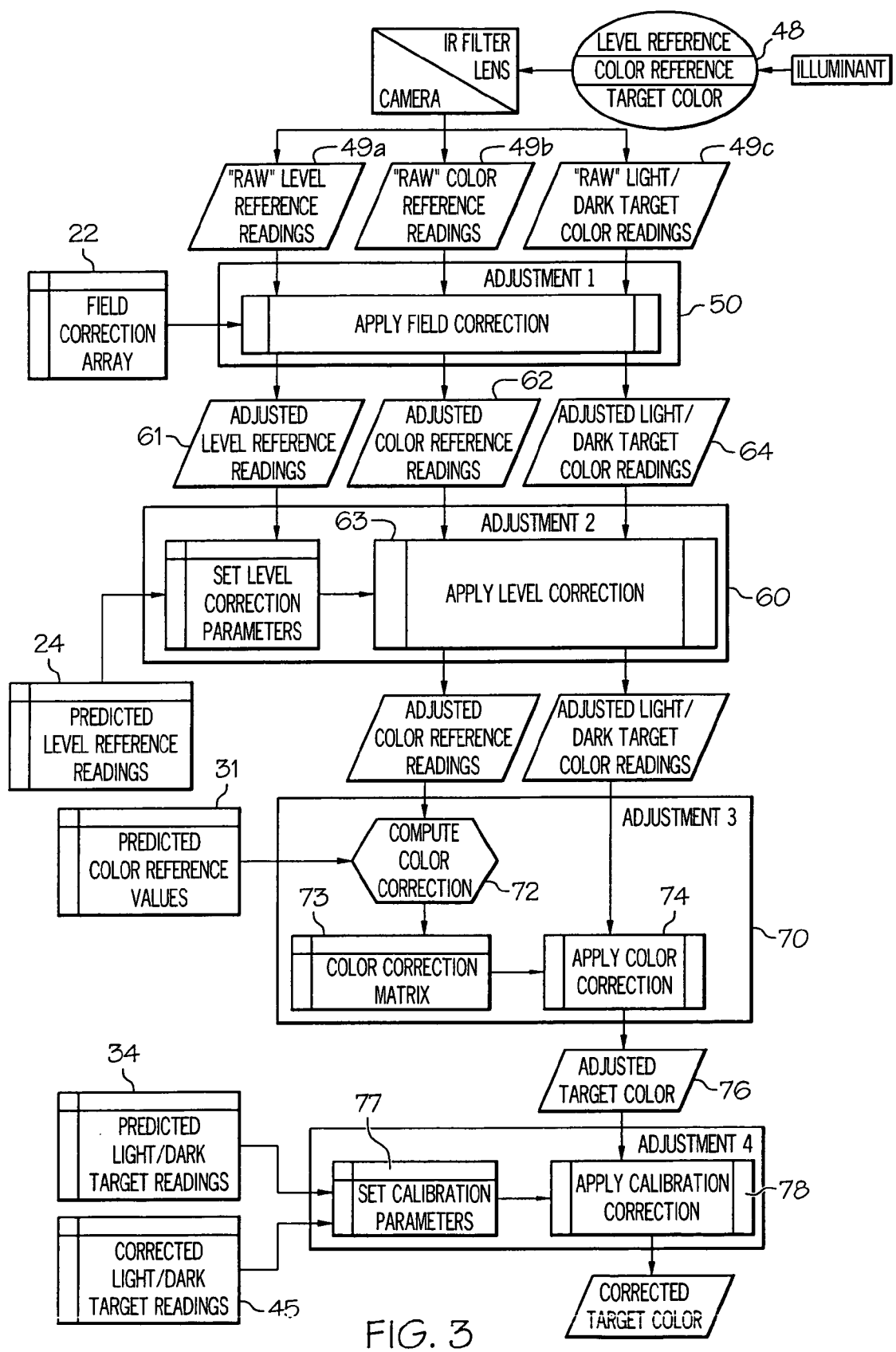
FIG. 3 is a flow chart showing the operational adjustments in accordance with one embodiment of the invention.

The adjustments are summarized in the flowchart shown in FIG. 3, and described in detail below.

Adjustment 1: Field Correction. In step 50, using the field correction array 22 ($x_i$ for each region (i) as calculated in Setup Step 1, and equation 4, where $r_i$ is the raw data from the actual reference colors,) $m_i$ becomes the field corrected raw data, adjusted to correct for uneven illumination and detector response.

$$m_i = x_i \times r_i \quad (4)$$

Adjustment 2: Level Correction. In step 60, two of the field corrected measurements 61 from the individual device are represented by the vectors $m_L$ and $m_D$ which contain the measured and field corrected red, green and blue channel values for the light and dark references respectively. Combining these with the vectors $t_L$ and $t_L$ derived at 24 in Setup Step 2 which represent the predicted values of the red, green and blue channel values for the light and dark references respectively, all of the field corrected measurements $m_i$ (62 and 64) can be level corrected at step 63 using the following equation.

$$x_i = \left(\frac{m_i - m_D}{m_L - m_D}\right) \times (t_L - t_D) + t_D \quad (5)$$

In equation 5, $m_i$ is the field corrected instantaneous measurement for region i and $x_i$ is the level corrected result. Each of the operations may be performed on a channel-by-channel basis (e.g., in a typical red-green-blue device, the R, G, and B channels are each calculated independently).

Adjustment 3: Color Correction. In step 70, the field- and level-corrected measurements for the color correction references in a typical red-green-blue image capture device are represented by the 3×m matrix X, where m is the number of fixed reference colors as described earlier. The color correction calculation process yields a correction matrix B as described in U.S. Published Application 2004/0179101 such that equation 6 is true, where Y is the matrix of predicted values 31 for the color corrected references developed in Setup Step 3.

$$Y = BX \quad (6)$$

There are several ways to solve for B. A common method is referred to as matrix linear regression as shown in equation 7 and described in the aforementioned application, where $X^T$ is the transpose of matrix X in equation 6.

$$B = [X^T X]^{-1} X^T Y \quad (7)$$

Once the color correction matrix B is calculated in step 72, the matrix 73 is applied to the readings in step 74 obtained from the unknown color in the target area as processed through adjustments 1 and 2 using the following equation.

$$x = Bu \quad (8)$$

In equation 8, B is the color correction matrix as derived in equation 7 above, u is the vector representing (typically red, green and blue) values for the unknown color in the target region, and x (obtained at 76) is the vector containing the color corrected result.

Adjustment 4: Calibration Correction. The calibration correction is the process that scales the field-, level-, and color-corrected unknown target measurement to the neighborhood of the predicted calibration sample response. Similar to the scaling done in Setup Step 2, at 77 scaling is again used to compensate for changes in the range of values reported by the device once all other mathematical adjustments are made. This scaling proportionally adjusts the range of values currently reported by the device to values in the range the device reported in its base state. The color corrected measurements from the individual device as captured in Setup Step 5 are represented by the vectors $x_L$ and $x_D$ which contain the measured values 45 for the light and dark calibration samples respectively. With the predicted values for the calibration samples as calculated in Setup Step 4, as represented by the vectors $C_L$ and $C_D$, the color corrected measurement can be calibration corrected in step 78 using the following equation.

$$a = \left(\frac{x - x_D}{x_L - x_D}\right) \times (c_L - c_D) + c_D \qquad (9)$$

In equation 9, x is the color corrected measurement of an unknown from equation 8, and a is the calibration corrected result. All of the operations are performed on a channel-by-channel basis (e.g., the typical R, G, and B channels are each calculated independently).

Illustrative Implementation

Figure 4:
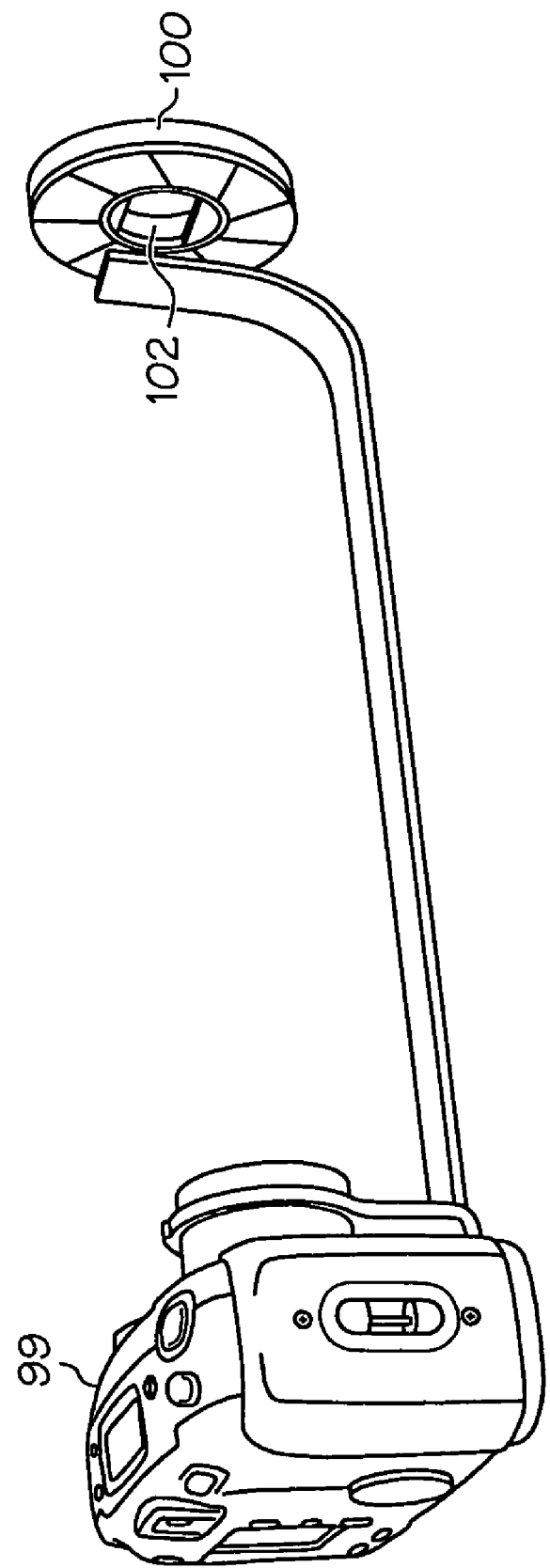
FIG. 4 is a perspective view of a digital camera and target with color reference arrays in accordance with one embodiment of the invention.

Although any color digital image capture device may be used, one embodiment is a still camera 99 with at least 240× 320 resolution. Reference colors can be presented as a "doughnut-shaped" ring 100 (see FIG. 4) with color segments that are attached or printed in a manner that ensures their color stability. This implementation positions the ring such that the area targeted for measurement 102 appears in the center of the ring, although the references and target can be in any arrangement as long as both are in the field of view of the image capture device/system.

The image capture device/system and reference color set can be packaged in several hand-held configurations to facilitate capturing an image of the target area. In one configuration, (a "closed" configuration") a light source may be provided to illuminate the target. In an "open" configuration, no independent light source is provided and ambient light provides the necessary illumination. The "stand-alone" configuration would include a processor that controls image capture and processes the resulting image and also include any of a variety of display and I/O components (e.g., LCD, touchscreen, keyboard, etc.) integrated into a single package with either an external power source or a provision for internal batteries for power. A "peripheral" configuration would only include the image capture components, and all processing would be in a separate package with any of several forms of interconnection (wired, rf, ir, etc). See exhibit 1 for examples.

Typical Operation

To take a measurement, the device is situated such that the color target to be measured is positioned in the imaging device's field of view in the measurement target region.

The device controller, when commanded to take a reading, will activate illumination, if the device is so equipped, capture the image or the relevant pixels from the image, and then deactivate the illumination. The controller performs the analysis and corrections of the image as described above, and then reports the result of the color measurement or processes it further according to the requirements of the application.

Having described the invention in detail and by reference to specific embodiments thereof, it will be apparent the numerous modifications and variations are possible without separating from the spirit and scope of the invention.

What is claimed is:

1. A method for obtaining a target color measurement using an electronic image capturing device having a plurality of reference colors and light and dark level correction references, comprising the steps of:

as a set up step, before measuring a target color:
  determining a field correction array by placing an identical color reference in each of a plurality of locations in the field of the image capturing device and computing a field correction array; and
  determining a level correction vector using the light and dark level correction references wherein the level correction vector is determined based upon a predicted value of red, green and blue intensities for each of the level correction references; and each time a target color is measured using the image capturing device:
  determining a color correction matrix under the conditions extant at the time that the target color is measured using the image capturing device based on the field correction array and the level correction vector; and
  determining a calibration correction under the conditions extant at the time that the target color is measured by application of the field correction array and the level correction vector determined in the set up step and application of the color correction matrix to the light and dark reference colors; and
  adjusting a target color measurement obtained using the electronic image capturing device based upon the color correction matrix, and the calibration correction to obtain a corrected color target measurement.

2. The method of claim 1 wherein the target color reading is made up of red, green and blue intensities.

3. The method of claim 1 wherein the electronic image-capturing device includes a plurality of color references and the color correction matrix is based upon a predicted or independently determined value of red, green and blue intensities for the color references.

4. The method of claim 1 wherein the calibration correction is obtained by measuring the red, green and blue intensities for a light color sample and a dark color sample, adjusting the measured intensities using the field correction array and the level correction vector and calculating the calibration correction based on the predicted or independently measured red, green and blue intensities for the light color sample and the dark color sample.

5. The method of claim 1 wherein the field correction array is calculated based upon the formula:

$$x_i = \frac{m_i}{c}$$

wherein $x_i$ is the field correction value, $m_i$ is the measured color intensity, and c is a constant.

6. The method of claim 5 wherein the uncorrected red, green and blue intensity data from the reference colors is field corrected based upon the formula: $m_i = x_i \times r_i$ wherein $m_i$ is the field corrected data, $x_i$ is the field correction array, and $r_i$ is the measured intensity.

7. The method of claim 1 wherein the target color measurement is field corrected to provide field corrected target reading and the field corrected target reading is level corrected based upon the equation:

$$x_i = \left(\frac{m_i - m_D}{m_L - m_D}\right) \times (t_L - t_D) + t_D$$

where $m_L$ and $m_D$ are vectors containing the measured and field corrected red, green and blue channel values for the light and dark references and $t_L$ and $t_D$ are the predicted values of the red, green and blue channel values for the light and dark references.

8. The method of claim 7 wherein a color matrix correction B is calculated and applied to the field corrected and level corrected target reading using the equation: x=Bu where u is a vector representing the red, green and blue intensities for the target color and x is the color corrected result.

9. The method of claim 8 wherein the method includes the step of correcting the color corrected target measurement based upon the following equation:

$$a = \left(\frac{x - x_D}{x_L - x_D}\right) \times (c_L - c_D) + c_D$$

wherein $x_L$ and $x_D$ represent vectors for the measured values for the light and dark calibration samples, $c_L$ and $c_D$ represent vectors for the color corrected target measurement and a is the calibration corrected result, and x is the vector containing the color corrected result.

* * * * *